INVENTOR.
WILLIAM J. PARKS
BY
F. L. Styner
ATTORNEY

Aug. 28, 1962 W. J. PARKS 3,051,787

BUFFER STORAGE BETWEEN MAGNETIC TAPE AND SYNCHRONOUS OUTPUT

Filed Sept. 4, 1958 4 Sheets-Sheet 2

INVENTOR.
WILLIAM J. PARKS

BY

ATTORNEY

INVENTOR.
WILLIAM J. PARKS

BY [signature]

ATTORNEY

BUFFER STORAGE BETWEEN MAGNETIC TAPE AND SYNCHRONOUS OUTPUT

Filed Sept. 4, 1958 4 Sheets-Sheet 4

INVENTOR.
WILLIAM J. PARKS
BY
T. L. Styner
ATTORNEY 3,051,787
BUFFER STORAGE BETWEEN MAGNETIC TAPE AND SYNCHRONOUS OUTPUT William J. Parks, Rochester, N.Y., assignor to General Dynamics Corporation, Rochester, N.Y., a corporation of Delaware Filed Sept. 4, 1958, Ser. No. 759,030
10 Claims. (Cl. 178—70)

This invention relates to transmitters for binary coded telegraphic systems, and is particularly directed to buffer storage means between pickup reading circuits and the transmitting circuits of the system. Buffer storage, as referred to here, comprises means immediately adjacent the message source for momentarily storing coded signals when the clock frequency and reading rate of the pickup circuits might drift from the precise synchronous rates of the teleprinter system.

Deviations from synchronous speeds are most likely to occur when the message originates on a motor driven wire or tape and must be fed directly into a teleprinter system operated at a precise predetermined clock frequency. Mechanical inertia of the moving parts, stretch in the tape, and imperfect spacing of magnetic or punch marks along the tape are examples of causes of asynchronous readout. In airborne teleprinter equipment, it is impractical because of weight to carry equipment to drive tape at a precise frequency and constant phase. Direct current or induction motors with speed controls are available which will run at the proper average speed but will drift to either side of synchronous speed.

An object of this invention is to provide means for reading coded binary messages and translating those messages even though the reading and translating speeds may relatively vary.

Another object of this invention is to provide means for reading coded binary messages at an asynchronous speed and transmitting those messages at synchronous speed.

A more specific object of this invention is to provide buffer storage means between asynchronous code reading circuits and synchronous transmitting circuits.

A still more specific object of this invention is to provide buffer storage between reading circuits for motor driven tape-type recording media and teleprinter-type transmitting circuits.

The objects of this invention are attained by a shift register comprising a series of cascaded flip-flops, the first in the series being coupled to a pickup reading circuit which is responsive to the available clock pulses of asynchronous frequency. The asynchronous pulses reset the first flip-flop and transfer the binary contents of the first flip-flop to the next succeeding flip-flop. The last two flip-flops in the series, however, are responsive to a source of clock pulses of exact synchronous frequency for transferring the binary content thereof into the teleprinter transmitting link. A clock pulse source of a frequency higher than and preferably an integral multiple of said synchronous frequency is employed in the intermediate stages of the series of flip-flops to accelerate the movement of the binary bits toward the output end of the series and thus produce the necessary "slack" in the register to accommodate the greatest drift or difference in the two speeds.

Other objects and features of this invention will become apparent to those skilled in the art by referring to the specific embodiment of the invention described in the following specification and shown in the accompanying drawing, in which.

Figure 1:
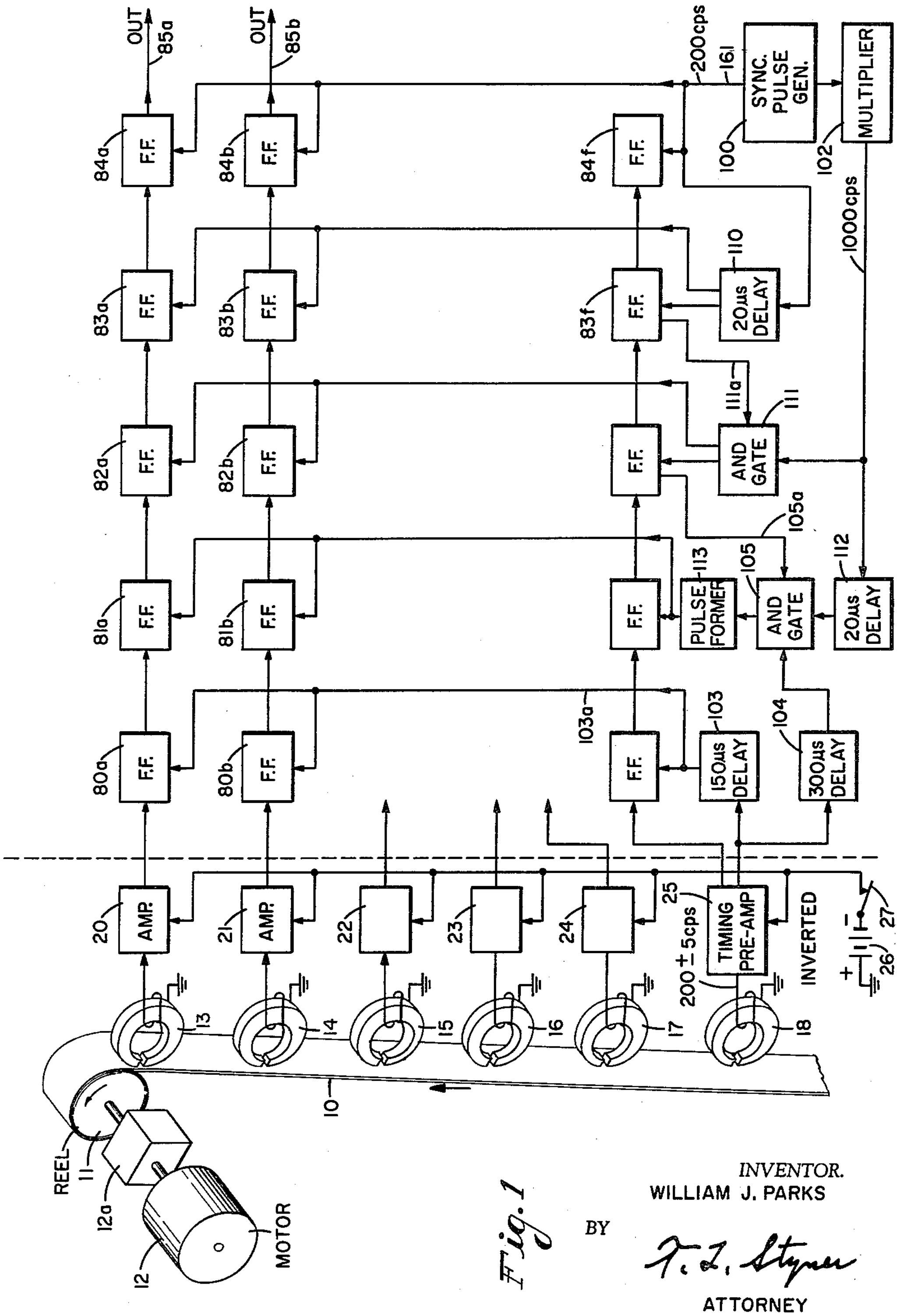
FIG. 1 is a block diagram of one buffer storage system of this invention.

In FIG. 1 is shown at 10 a tape as one example of a medium upon which binary coded message information may be recorded. Permanent storage of such information could be effected upon wire or plastic recording discs, or cylinders, or in electrical storage devices of various kinds. In FIG. 1, it is assumed that the tape 10 is to be drawn by reel 11 which in turn is driven by the motor 12. The coupling between the reel and motor can be expected ordinarily to include a speed reduction gear train 12*a*.

Tape 10 is assumed to have five parallel information grooves or channels for the conventional five bit code, as well as a groove for clock pulses. Magnetic readout is contemplated and in FIG. 1 is shown the five information readout heads 13, 14, 15, 16 and 17, spaced side-by-side across the width of the tape or staggered along the tape as space requirements may dictate. To the heads are coupled, respectively, conventional preamplifiers 20, 21, etc., which in turn are connected to shift registers. Two only of the five registers are shown. The sixth readout head 18 reads the clock pulses on the tape.

In the premise of this invention it is assumed that the clock pulses derived from head 18 are not synchronous but are near synchronous frequency and vary or drift slowly or rapidly between three or four pulses per second, say, ahead of or behind synchronous frequency. Speed variations may be traced to the parts driven by the motor, even though the motor is run at precise synchronous speed. The gear train, reel, and tape handling mechanism invariably has backlash, and the tape has flutter, whip, and stretch which produces asynchronous clock pulses. Such asynchronous pulses cannot, of course, be fed directly into a teleprinter system operating at a precise synchronous speed. In FIG. 1, buffer storage comprising the shift registers is shown for momentarily storing the asynchronous binary bits and feeding them at synchronous speeds to the outgoing link.

Storage is in shift registers which are preferably of the type comprising a series of cascaded flip-flops. A suitable flip-flop and the one described here comprise two transistors, with cross-connected feedback circuits to insure one transistor is conducting while the other is nonconducting. Tubes could be substituted, if desired. With the output of each transistor coupled to the input electrode of the opposite transistor, and with the proper bias potentials, the pair remains stably in one condition until an actuating trigger pulse is applied to one control electrode. If one triggering pulse is said to "set" the flip-flop, a like pulse applied to the other control electrode is said to "reset" the flip-flop. An output circuit connected to the output electrode of either transistor will rise, say, when the flip-flop is set and will drop when the flip-flop is reset. Arbitrarily, when one of the output terminal voltages is low, the flip-flop will be said to contain "0," and when the output terminal is high, the flip-flop will be said to contain "1." If a "0" is fed to a flip-flop containing "0," or a "1" is fed to a flip-flop containing a "1," no change in state results. If, however, a "1" is fed into a flip-flop containing a "0," the stable state is reversed. When the reset pulse arrives, the "1" or "0" bit is passed on to the next succeeding stage of the register.

Figure 2:
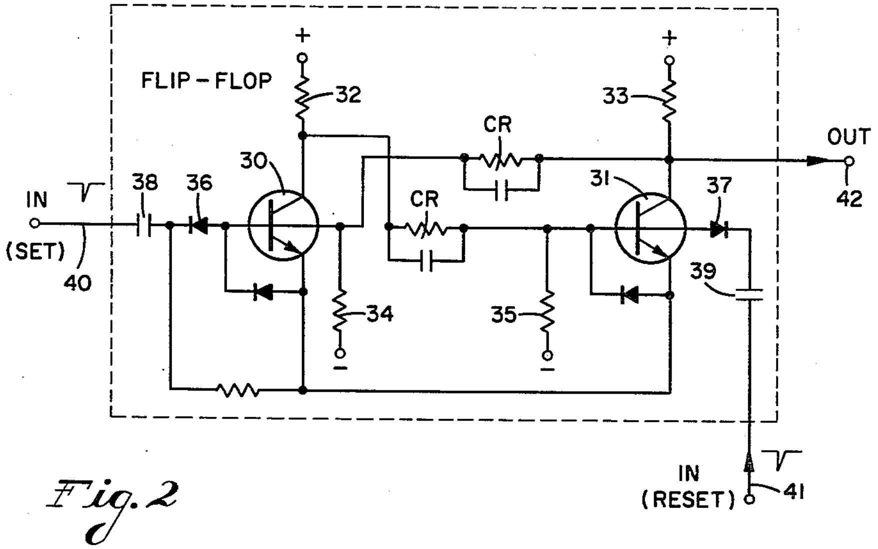
FIG. 2 is a circuit diagram of one flip-flop or bistable multivibrator which can be used in the system of FIG. 1.

One flip-flop is shown in FIG. 2 which has been found to be useful throughout the many stages of the several shift registers. The flip-flop shown comprises the two N-P-N type transistors 30 and 31 connected as commonemitter amplifiers with load resistors 32 and 33. The collector end of each load resistor is coupled through a CR circuit to the base of the opposite transistor. Each base is biased, respectively, through resistors 34 and 35, and is coupled, respectively, through diodes 36 and 37 in series with blocking condensers 38 and 39 to input terminal 40 or 41. The output terminal 42 is coupled to the collector of transistor 31, although the output circuit could, if desired, be coupled to the collector of the other transistor. The circuit parameters and bias voltages are so selected as to insure relatively heavy collector-to-emitter current of one transistor, while the other transistor is substantially blocked. That is, if transistor 30 is conducting, the collector of 30 and the base of 31 are held at a potential below cutoff for transistor 31. With such a circuit, conduction in 30 can be interrupted only by a relatively sharp negative pulse at input 40. Such a pulse in this example arrives from the preceding flip-flop of the series and is termed the "set" pulse. If, however, transistor 31 is conducting and 30 is blocked, reversal can be effected only by a sharp negative pulse arriving at input terminal 41. This pulse is termed the "reset" pulse and is derived from one of the several clock pulse sources of the system, and shown across the bottom of FIG. 1. The flip-flop of FIG. 2 will arbitrarily be said to contain a "1" when output terminal 42 is "high," meaning that 31 is blocked and 30 is conducting, and will be said to contain a "0" when output terminal 42 is "low." The output potential will change only by the application of an appropriate set or reset pulse. Since the output 41 is connected to the input of the next succeeding flip-flop, the input of which is identical to the input at 40, only a change in one output potential will effect the next succeeding flip-flop. It is to be noted further that in the example shown only negative-going pulses applied to the base of a conducting transistor will effect a change. It follows that "1's" and "0's" will step forwardly through succeeding flip-flops at the pulse rate of the set and reset pulse sources.

Figure 3:
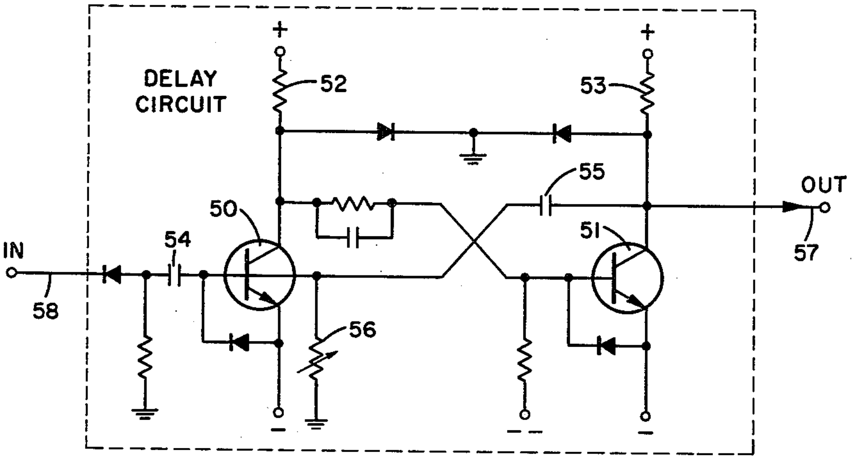
FIG. 3 is a circuit diagram of one pulse delay device that is of use in the system of FIG. 1.

In FIG. 3 is shown one type of delay circuit which is important in the operation of the storage registers of this invention. The delay circuit shown is of the monostable multivibrator type and comprises, in the example shown, transistors 50 and 51 of the N-P-N type with load resistors 52 and 53 clamped to ground as shown and with each collector coupled to the base of the opposite transistor. The bias sources and circuit parameters are so chosen that flip-flop 50 is normally conducting and transistor 51 is normally blocked. When a negative-going pulse is applied through the coupling condenser 54 to the base of 50, the normal state is reversed and the now low collector voltage at 51—53, coupled to the base 50 through the CR circuit including condenser 55 and resistor 56, will hold the delay circuit in the reversed state for a time measured by the CR circuit. That is, after a predetermined time, say 150 microseconds, the voltage of the base 50 rises and permits the transistor 50 to again start to conduct. This produces at output 57 a pulse, a measured delay after the pulse at the input terminal 58. The amount of delay is easily adjusted by changing the values of condenser 55 or resistor 56.

Figure 4:
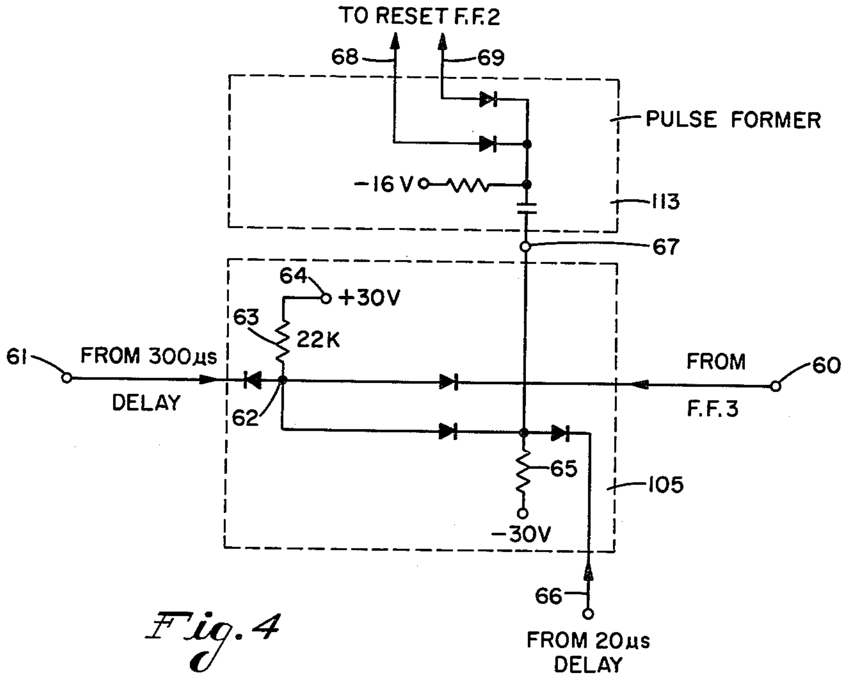
FIG. 4 is a schematic diagram of an AND circuit with an inhibitor circuit useful in the system of FIG. 1.
Figure 5:
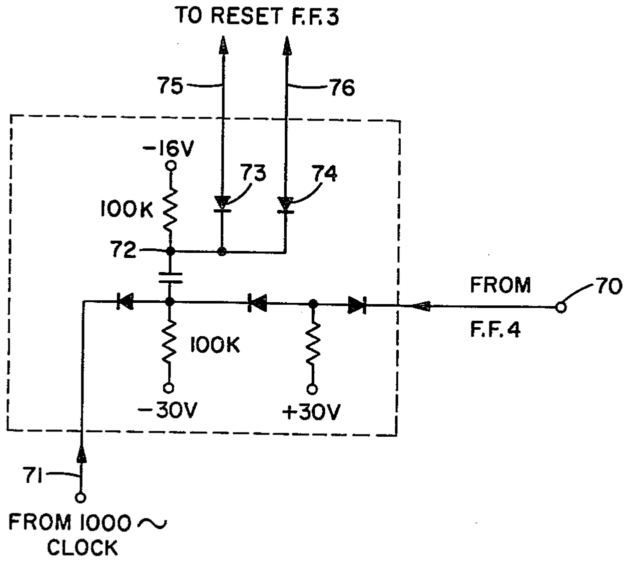
FIG. 5 is a schematic diagram of an AND circuit useful in FIG. 1.

Other important subassemblies of the buffer storage of this invention shown in FIG. 1 comprise the logic AND gates of FIGS. 4 and 5. In FIG. 4, negative voltages must simultaneously appear at input terminals 60 and 61 before junction 62 can raise from some predetermined low voltage level established by the load resistor 63, its positive voltage source 64 and the biasing resistor 65. The rise in potential at junction 62 must simultaneously occur with the arrival of a negative pulse at input terminal 66 to produce a positive output pulse at output terminal 67. In FIG. 4 the output pulse is shaped in the pulse former and applied in parallel to reset lines 68 and 69. The voltage at terminal 61 is normally high to inhibit an output from the AND gate and to permit an output only during a measured time interval, say 300 microseconds, beginning with a tape clock pulse.

FIG. 5 shows another AND gate similar to that of FIG. 4 but without an inhibitor circuit. The diodes and load resistors shown require the simultaneous arrival of negative pulses at terminals 70 and 71 to produce a negative-going output pulse at junction 72. Such an output pulse is applied in parallel through diodes 73 and 74 to the reset lines 75 and 76.

Returning to FIG. 1, the information bits derived from the pickup heads 13 to 17 are immediately amplified in the preamplifiers 20, 21, etc. Each amplifier has three stages preferably, which provide an output of approximately five volts to drive the first stage of the buffer storage. The band-pass characteristics of the preamplifiers are purposely made narrow so that any high frequency noise at the input to the amplifiers would be suppressed before reaching the flip-flops. If the amplifiers are composed of three stages, their output voltages can normally be inverted with respect to the pickup voltage. This output is employed to perform timing functions in the first stage of each of the shift registers. The first two of the three stages in the preamplifiers preferably provide linear amplification of the input signal, and the third stage is driven to saturation so that a square wave output is obtained. This output is then differentiated by conventional circuits, not shown, and the negative spike of the differentiation is used to trigger the first flip-flop in each register. The flip-flops in one register are designated 80*a*, 81*a*, 82*a*, 83*a* and 84*a*. The flip-flops in the next register are designated 80*b*, 81*b*, 82*b*, 83*b* and 84*b*. The flip-flops in the third, fourth and fifth registers are identical to the first and second and are, accordingly, not shown.

It is important that all stages of the storage circuits be free of information before a message is started and that information be sent to the storage circuits only after a precise waiting period has elapsed. That is, the preamplifiers should all be biased to cutoff until a signal start pulse is received. For this purpose, a normally closed biasing circuit is shown in FIG. 1 with the battery 26, and switch 27 for simultaneously unblocking all amplifiers at the start of readout.

Since it is convenient in many recording systems to record "1's" by magnetic spots, punched holes or other marks, and to record "0's" by the absence of such marks, the timing preamplifier 25 must not only time and synchronize all readout operation but must supply the "0's" of the message.

When a "1" is picked up by readout head 13 from a magnetic tape, a positive voltage and negative voltage pulse appears at the input of the preamplifier. Since the reversal of flux takes place in two equal increments along the tape, the positive and negative pulses will be displaced from each other by 180 electrical degrees measured over one clock interval or cycle. The positive pulse output is the one used for the timing and information channels, these pulses being fed to the three-stage preamplifiers with a resultant amplified negative pulse output to the flip-flops. However, the timing channel preamplifier contains four stages and delivers a negative pulse output, displaced 180 degrees from the information pulses. As explained above, the storage flip-flops can utilize only negative input pulses.

Also available to the buffer storage system of FIG. 1 is a source of synchronous clock pulses from generator 100. Generator 100 produces pulses of exact synchronism and is entrained by information received from the teleprinter system. Such timing information may, for example, be received by a separate radio link. From the synchronous source is obtained clock pulses of a frequency equal to the average frequency of the tape readout. Motor 12 could, if desired, be controlled in speed by source 100.

When a bit of information emanates from one of the information channel preamplifiers, it is immediately transferred to the first stage 80 of the connected register. The inverted timing channel output, which is in synchronism with but delayed in phase with respect to the information pulses read from the tape, is applied first to the delay circuit 103. In the example chosen, delay circuit 103 delays the clock pulse 150 microseconds. Thereupon the delayed clock pulse is used to reset all of the first stage flip-flops of the registers, via conductor 103*a*. This reset operation transfers the information held in the several first stages to the second stages.

The inverted timing channel output is also fed to the delay circuit 104, which in this example provides 300 microseconds delay. The output from this delay is employed in the inhibitor AND gate 105 to prevent the second stage from becoming reset during this 300 microsecond interval. The 150 and 300 microsecond delays combined prevent the possible transfer of information into the second stage while the second stage is being reset.

According to an important feature of this invention, the final or fifth stage of each register is set and reset at the precise synchronous speed of the teleprinter system, whereas the first stage of each register is operated at the asynchronous speed of the tape, the intermediate stages being set and reset at a speed significantly higher than synchronous speed. As suggested above, this high synchronous speed is preferably an integral multiple of the synchronous output speed and is, for example, 1000 c.p.s. if the synchronous speed is 200 c.p.s. A 1000 c.p.s. clock pulse rapidly advances the information inserted into the second stage along the stages of the buffer storage to the stage just previous to the stage containing information. Thus information is always available at the output stage even though the intermediate stages are intermittently filled and emptied. The buffer storage of this invention makes it possible for the tape speed to vary about an average 200 c.p.s., while the ultimate readout and transmission is held at the precise 200 c.p.s. Stated differently, the 1000 c.p.s. operation of the intermediate stages provide sufficient "slack" in the time base to permit variations in input speed with respect to output speeds.

It is important that the reset be inhibited both before and after the time information is inserted into a stage inasmuch as information would be lost if a reset pulse was received in the stage at the same time that information was being inserted into it. The values of the delay periods may be varied, it having been found that 150 microseconds was satisfactory in stages operating at 200 c.p.s.

In FIG. 1, the fifth stage 84 of each register is reset by the 200 c.p.s. output of the local synchronous pulse generator 100, the outputs of flip-flops 84*a*, 84*b*, etc., being fed, respectively, to the outgoing transmission circuits 85*a*, 85*b*, etc. The 200 c.p.s. output of synchronous generator 100 is also applied to the reset circuits of the fourth stage of each register but after a short delay. A 20 microsecond delay in delay circuit 110 is found to be satisfactory. By this arrangement, it is certain that no information can be transferred into the fifth stage before or during transfer of information out of that stage. That is, this 20 microsecond delay is the transition period from the time of arrival of the 200 cycle readout signal to the time when the information is actually made available to the output teleprinter circuit.

The 1000 c.p.s. signal from the synchronous generator and multiplier 102 is employed to reset the third stage 82 provided there is no information standing in the fourth stage 83. For this purpose, the AND gate 111 with a feedback circuit 111*a* from the fourth stage is employed to prevent premature reset of the third stage. The feedback circuit 111*a* is connected at one end to any point in flip-flop 83*f* which stands at a distinct high voltage, say, when the flip-flop is set, and at the other end to a point in the AND gate 111 which will prevent passage of a clock pulse. This point in the AND gate of FIG. 5 would be terminal 70.

The 1000 c.p.s. clock pulse is then delayed 20 microseconds in the delay circuit 112, FIG. 1, and is used as the clock pulse to reset the second stage. This second stage will reset provided there is no information in the third stage by virtue of feedback 105*a* and also provided that the 300 microsecond inhibition gate from 104 is not present. That is, wire 105*a* inhibits the passage of the 1000 cycle sync pulse into the reset circuit to prevent transfer of information from 81 to 82 when flip-flop 82 contains information. Delay circuit 104 inhibits 105 to prevent the transfer of the 1000 cycle sync pulse into the reset circuit of 81 so that information is not transferred out of flip-flop 81 until all of the flip-flops in storage bank 81 have received information from storage bank 80. Since flip-flops 81 and 82 are both reset by the 1000 cycle sync pulse, the resetting of flip-flop 81 is delayed for 20 microseconds to allow the information from flip-flop 82 to be transferred to flip-flop 83 before the information from flip-flop 81 is transferred into flip-flop 82. The reason for this is that information cannot be transferred into a flip-flop while information is being transferred out of that flip-flop.

The AND gate 105 may be of the inhibitor type shown in FIG. 4. The output from the inhibitor AND gate 105 is fed to the pulse fromer 113, the purpose of which is to provide either a pulse of sufficient amplitude to positively reset the second stage or to not reset the second stage and, hence, prevent reaction to input signals of marginal amplitude. Marginal or insufficient signal amplitude could result if the 300 microsecond inhibited gate pulse were being removed at the same time the clock pulse from the 20 microsecond delay circuit 112 was being driven negative, in which case the resultant output voltage from the AND gate 105 could be of any value from zero to full amplitude. The pulse former 113 is set up to give full output when the input signal reaches some intermediate value and to give no output when the input signal is below that value.

With the safety features provided by the delay and AND gate circuits shown, information will move forwardly from the asynchronous end of the register to the synchronous end thereof without danger of errors caused by accidental overlap of the three resetting clock pulses, including the asynchronous timing pulse from preamplifier 25, the 200 c.p.s. synchronous clock pulse from generator 100, and the 1000 c.p.s. synchronous clock pulse from multiplier 102. These three pulses read out the message from the variable speed tape and feeds that information to the precisely timed teleprinter transmitting circuit without error or ambiguity. By increasing the number of stages serially connected in the registers, the permissible difference in input and output speeds can be increased.

Figure 6:
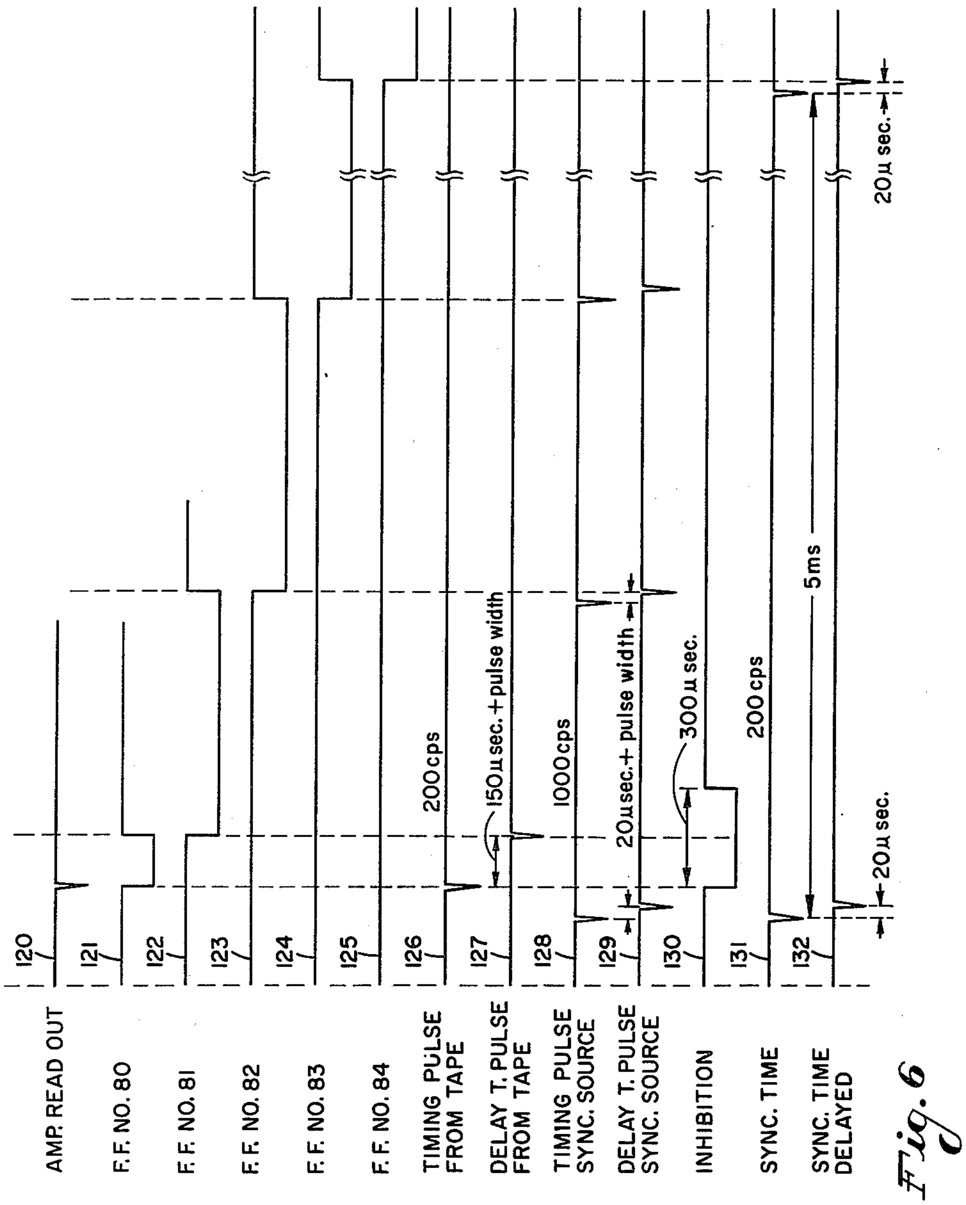
FIG. 6 is a set of representative voltages on similar time scales to illustrate the operation of the system of FIG. 1.

FIG. 6 shows a family of curves for demonstrating the time relationships of important pulses and flip-flop voltages of the system of FIG. 1. The top line, 120, of the family shows a pulse which is read out from any of the pickup heads 13–17 and amplified by one of the amplifiers 20—24. This pulse changes the state of flip-flop 80 as shown on line 121. Reset of flip-flop 80 changes the state of 81, line 122, and so on for each of the succeeding flip-flops 82, 83 and 84, shown on lines 123, 124 and 125. The time scale has been compressed to permit reasonable detail in the drawing. The vertical dotted lines show the coincidence in time of the pulses and flip-flop voltages, the time pulse from the tape on line 126 being in coincidence with the information readout pulse, line 120. The delay timing pulse 127 from the tape is assumed to be 150 microseconds plus the pulse width. The synchronous timing pulse from the multiplier 102, shown on line 128, is at the higher 1000 cycles per second frequency and may not be in time coincidence with the lower speed asynchronous time pulses. The pulse on line 128 is delayed 20 microseconds plus pulse width as suggested on line 129. The inhibition voltage of line 130 applied to the input of AND gate 105 prevents operation of flip-flop 81 until after the contents of the flip-flop has been emptied into 81. Lines 131 and 132 are added to show the synchronous clock pulses at the output of generator 100, before and after a 20 microsecond delay, respectively.

Many modifications may be made in the components of the system of FIG. 1 without departing from the scope of the appended claims. For example, the delay circuits 103 or 104 or 110 may assume various configurations in addition to the monostable multivibrator of FIG. 3. Further, the flip-flops of FIG. 2 could be revised to operate on positive-going set and reset pulses instead of the negative-going pulses described above. Still further, the coincidence circuits of the particular AND gates of FIGS. 4 and 5 could, if desired, be replaced by any conventional coincidence circuit having the required two, three or more input circuits. Finally, the high frequency clock pulse source (1000 c.p.s. in the illustrated example) could if desired be derived from the asynchronous source 25.

What is claimed is:

1. In combination in a coded telegraphic transmitter having a recorded message medium, and pickup means for reading binary code symbols at near synchronous frequency, said transmitter comprising a first clock pulse source connected to said message medium for generating clock pulses of near synchronous frequency, a shift register with a plurality of cascaded flip-flops, one output electrode of each flip-flop being coupled directly to one input electrode of the next adjacent flip-flop, the input of the first flip-flop being coupled to said pickup means and the last flip-flop of the register being coupled to a teleprinter transmitting link of synchronous frequency, means connected to said pickup means and responsive to said first clock pulses of said near synchronous frequency for resetting said first flip-flop and transferring the binary content of the first flip-flop to succeeding flip-flops, a second source of clock pulses of synchronous frequency, means connected to said second source and responsive to clock pulses of said synchronous frequency for resetting said last flip-flop and transferring the binary content of the last flip-flop to said transmitting link; a third clock pulse source of a frequency distinctly higher than said synchronous frequency, flip-flops intermediate said first and last flip-flops being responsive to the higher frequency clock pulses for moving binary information read at asynchronous speeds toward the last flip-flop.

2. In combination in a coded telegraphic system, a speed changing buffer storage means for feeding binary coded message bits from a source operated at a near-synchronous clock frequency to a circuit operated at a synchronous clock frequency, said system comprising a source of binary coded message bits occurring at a clock frequency rate which may vary between values greater and less than said synchronous frequency rate, a series of cascaded flip-flops, the input end of said series being coupled to the asynchronous source and the output end of said series being coupled to said synchronous circuit, and means for stepping said message bits through intermediate stages of said series toward the last stage at a rate substantially higher than said synchronous rate to insure that information bits arrive at and stand in the last stage for synchronous transmission at all asynchronous input speeds.

3. In combination in a coded telegraphic transmitter, a shift register comprising a plurality of cascaded flip-flops, means for feeding coded information into the first stage of said register, an output transmission circuit coupled to the output of the last of the flip-flops of said register, means for asynchronously resetting said first flip-flop and transferring information from the first to the second flip-flop, means for resetting the final flip-flop of said register and transferring the contents thereof at synchronous speeds to said transmission circuit, the average asynchronous speed and the synchronous speed being approximately equal; and a clock pulse source having a pulse repetition frequency which is an integral multiple of said synchronous speeds, said clock pulse source being coupled to intermediate flip-flops of said register for resetting and transferring step-by-step binary information between said intermediate stages.

4. In combination in a coded telegraphic transmitter, a buffer storage comprising a plurality of cascaded flip-flops, a synchronous clock pulse source connected to said flip-flops for resetting each flip-flop and transferring the binary content of one flip-flop to the next flip-flop, an asynchronous pulse source, a gate, said gate being connected between said clock pulse source and one of said cascaded flip-flops, a first control circuit connected to the flip-flop succeeding said one flip-flop, a second control circuit coupled to said asynchronous pulse source, said control circuits being responsive, respectively, to binary voltages in said succeeding flip-flop and said asynchronous pulse source for opening said gate to admit a clock pulse from said synchronous pulse source to said one flip-flop.

5. In combination in a coded telegraphic system, a plurality of cascaded flip-flops, a first clock pulse source for operating one flip-flop, a second clock pulse course for operating the second and third succeeding flip-flops, a gate connected between said second clock pulse source and the reset circuit of said second flip-flop, and said gate having control circuits connected and responsive, respectively, to said third flip-flop and to said first clock pulse source.

6. In combination in a telegraphic system, a buffer storage for coupling an asynchronous binary message to a synchronous transmission circuit, said buffer storage comprising a series of cascaded flip-flops, a pulse source of asynchronous frequency for stepping the first of said cascaded flip-flops, a synchronous clock pulse source for stepping the last of said cascaded flip-flops, a gate, said gate being connected between said synchronous clock pulse source and an intermediate flip-flop of the cascaded series, a delay circuit connected between said asynchronous pulse source and one control circuit of said gate, and a connection between a succeeding flip-flop and another control circuit for said gate for preventing operation of said intermediate flip-flop during resetting operation of either preceding or succeeding flip-flops.

7. In combination in a coded telegraphic system having a buffer storage system between an asynchronous and a synchronous transmission circuit of like average speeds, said storage system comprising a plurality of cascaded flip-flops, means connected to the first flip-flop for setting and resetting the first flip-flop at asynchronous speeds, means for setting and resetting the final flip-flop at synchronous speeds, and means for setting and resetting an intermediate flip-flop in said series at a speed which is an integral multiple of said synchronous speed.

8. In combination in a telegraphic transmitter for binary information, a buffer storage comprising a series of cascaded flip-flops, a synchronous pulse generator, said pulse generator being connected to the reset circuits of two adjacent flip-flops, a delay circuit connected between said generator and the reset circuit of only the first of said two flip-flops for preventing transfer of binary information into the second flip-flop while binary information is being transferred out of said second flip-flop.

9. In combination in a telegraphic system, a buffer storage, said buffer storage including a shift register having a series of cascaded flip-flops, a synchronous pulse generator, said pulse generator being connected to the reset circuit of one of said flip-flops, means for deriving an harmonically related clock pulse from said generator, and means for applying said harmonically related pulse to the flip-flop in said series next preceding said one flip-flop.

10. In combination in a telegraphic system, a series of cascaded flip-flops, a synchronous clock pulse source, an AND gate, said AND gate having an output circuit and a plurality of control circuits all of which must simultaneously apply signal voltage to said AND gate to produce a signal voltage at said output circuit, one control circuit of said AND gate being connected to said clock pulse source, said output circuit being connected to the reset circuit of one flip-flop of said series, another control circuit of said AND gate being connected to and responsive to a binary voltage in the next succeeding flip-flop to prevent transfer of binary information from said one flip-flop into said next succeeding flip-flop until said next succeeding flip-flop is emptied.

References Cited in the file of this patent

UNITED STATES PATENTS

| | | |
|---|---|---|
| 2,806,947 | MacKnight | Sept. 17, 1957 |
| 2,858,429 | Heywood | Oct. 28, 1958 |
| 2,991,452 | Welsh | July 4, 1961 |